(No Model.)
J. J. MEFFORD.
LATHE DUST TRAP.
No. 413,606. Patented Oct. 22, 1889.
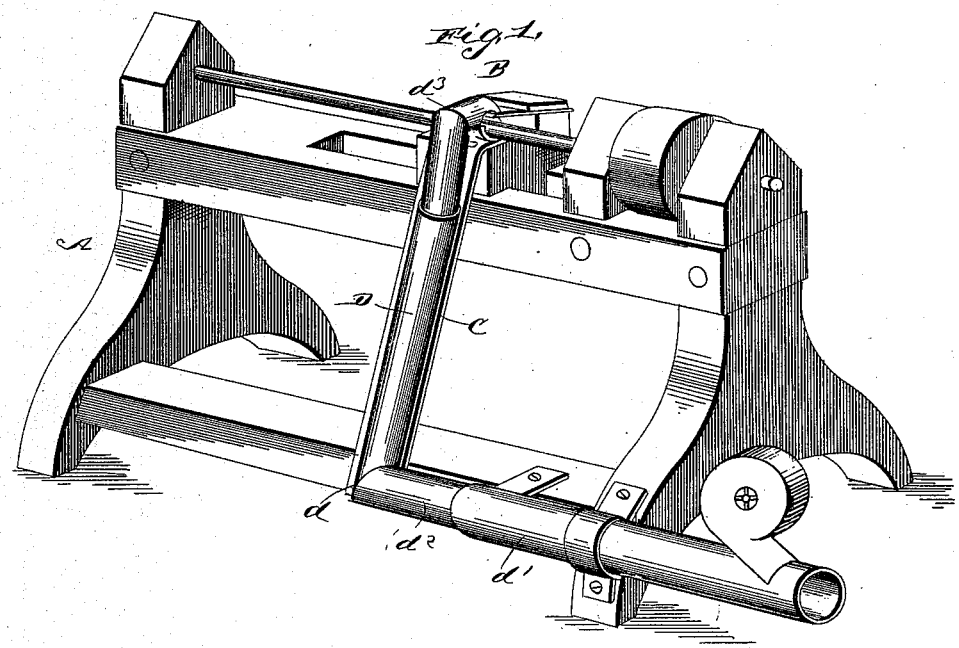
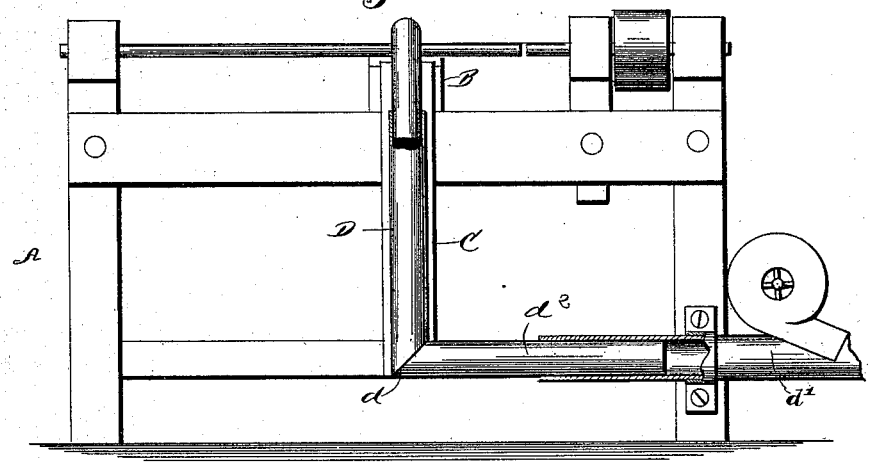
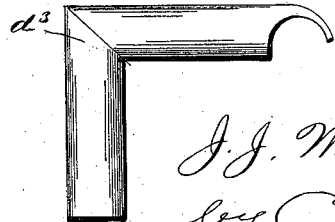
WITNESSES
INVENTOR
J. J. Mefford

United States Patent Office.

JOHN JAMES MEFFORD, OF INDIANAPOLIS, INDIANA.

LATHE DUST-TRAP.

SPECIFICATION forming part of Letters Patent No. 413,606, dated October 22, 1889.

Application filed May 12, 1887. Renewed September 3, 1889. Serial No. 322,852. (No model.)

*To all whom it may concern:*

Be it known that I, JOHN JAMES MEFFORD, a citizen of the United States, residing at Indianapolis, in the county of Marion and State of Indiana, have invented a new and useful Improvement in Dust-Traps, of which the following is a specification.

My invention relates to dust-traps for use in connection with various kinds of lathes; and it consists in the construction and arrangement of the parts of the same, which will be more fully hereinafter described, and pointed out in the claims.

The object of my invention is to provide a novel attachment for use in connection with lathes, whereby the dust therefrom may be carried away from the machine and deposited in the furnace-room to be used as fuel. I attain this object by the mechanism illustrated in the accompanying drawings, wherein like letters of reference indicate similar parts in the several views, and in which—

Figure 1 is a perspective view of a lathe with my improvement shown in connection therewith. Fig. 2 is a front elevation of the arrangement shown in Fig. 1 and illustrating the telescopic joint. Fig. 3 is a detail perspective view of my improvement detached from the lathe.

A indicates a lathe of any preferred form of construction, having a carriage B, operated by a screw, and which causes said carriage to travel back and forth, as will be readily understood and is well known in the art to which it appertains.

My invention consists in providing a conveyer for use in connection with the lathe, capable of traveling with the carriage B and adapted to transmit all dust or cut material from the gouges or chisels held by the lathe to a suitable place of deposit in the furnace-room.

To this end my improvement consists in securing to one side of the lathe a metallic supporting-frame C, which supports a pipe D, which forms the dust-conveyer. This pipe D is formed with a telescopic connection $d$, which is constructed by providing a pipe $d'$ of larger diametric cross-section than the main portion of the pipe, and in which the other section $d^2$ of the said pipe enters and moves in its operation by the lathe-carriage.

The pipe $d'$ is permanently secured to the lower portion of the lathe, while the pipe $d^2$ is free to move as the carriage B is caused to travel. To the upper end of the pipe $d'$ an elbow $d^3$ is attached, and which may be removed therefrom at will, as may be desired. This elbow is formed in the shape of a hood at its inner end, which incloses the cutting-tools held by the lathe, and the dust or chips formed by the said cutting-tools is drawn into the hood and through the pipe away from the lathe and deposited in any desired place. The lower side of the hood, as just described, must of necessity be constructed open and may be situated above the cutting-tools or cover the same, as may be desired and practicable. As the carriage B travels back and forth on the lathe the section $d^2$ moves in and out of the pipe $d'$, but at all times retaining the connection between the two said sections. The pipe $d'$ is adapted to be extended and connected to a suction fan or blower, and the force of the said fan being exerted through the said pipes, as described, will draw the dust and chips therethrough and cause them to be deposited at any distance desired or in any place preferred.

My improvement is adapted for use in connection with lathes of any form, or with lathes turning large or small articles, the parts requiring but little change to adapt them for use in connection with either a gouge-lathe or a lathe having a drop or back knife.

The telescoping or sliding joint allows the hood to accommodate itself to the long or short travel or motion of the carriage as long or short material is being worked and operated upon. The said hood and elbow sections can be removed, when desired, for conveniently adjusting the bits.

The utility and adaptability of my improvement being apparent, it is unnecessary to further enlarge upon the same herein.

Having thus described my invention, what I claim as new, and desire to secure by Letters Patent, is—

1. The combination, with a lathe, of a telescoping dust-collecting pipe having one section secured to the carriage of the lathe and the other section secured to a fixed support, substantially as set forth.

2. The combination, with a lathe, of the pipe D, having the enlarged section $d'$, the section $d^2$, telescoping therein, and the hood $d^3$, and the sliding frame C, secured to the carriage of the lathe and supporting the section $d^2$, substantially as described.

3. The combination, with a lathe, of the pipe D, having a telescoping joint and a hood $d^3$ arranged over the cutting-tools, the frame C, supporting one end of the pipe and secured to the lathe-carriage, and means for causing a suction in said pipe, substantially as described.

4. The combination, with the movable carriage of a lathe, of a telescoping dust-conveying pipe connected to said carriage and controlled thereby, and means for causing a suction in said pipe, substantially as set forth.

In testimony that I claim the foregoing as my own I have hereto affixed my signature in presence of two witnesses.

JOHN JAMES MEFFORD.

Witnesses:
 ALBERT TRAVIS,
 J. O. MEFFORD.